United States Patent
Chen et al.

(10) Patent No.: US 9,626,269 B2
(45) Date of Patent: Apr. 18, 2017

(54) ELECTRONIC SYSTEM AND NON-TRANSITORY COMPUTER READABLE RECORDING MEDIUM CAN PERFORM REPORT RATE SETTING METHOD

(71) Applicant: PixArt Imaging Inc., Hsin-Chu (TW)

(72) Inventors: Chun-Wei Chen, Hsin-Chu (TW); Yen-Min Chang, Hsin-Chu (TW); Yen-Chang Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 14/141,442

(22) Filed: Dec. 27, 2013

(65) Prior Publication Data
US 2014/0372633 A1    Dec. 18, 2014

(30) Foreign Application Priority Data
Jun. 17, 2013 (TW) .............................. 102121354 A

(51) Int. Cl.
*G06F 3/00* (2006.01)
*G06F 11/30* (2006.01)

(52) U.S. Cl.
CPC ................ *G06F 11/3051* (2013.01)

(58) Field of Classification Search
None
See application file for complete search history.

(56) References Cited

U.S. PATENT DOCUMENTS

| | | | |
|---|---|---|---|
| 2006/0153307 A1* | 7/2006 | Brown | H04L 1/24 375/257 |
| 2006/0212247 A1* | 9/2006 | Shimoyama | G06F 1/3203 702/89 |
| 2008/0220828 A1* | 9/2008 | Jensen | 455/574 |
| 2008/0304174 A1* | 12/2008 | Itagaki et al. | 360/73.01 |
| 2009/0059872 A1* | 3/2009 | Malik | H04W 4/02 370/338 |
| 2011/0296065 A1* | 12/2011 | Daecke | G06F 13/4291 710/61 |
| 2011/0321112 A1* | 12/2011 | Nagy | H04W 28/22 725/118 |
| 2012/0290784 A1* | 11/2012 | Katagiri et al. | 711/111 |

* cited by examiner

*Primary Examiner* — Elias Mamo
(74) *Attorney, Agent, or Firm* — Winston Hsu; Scott Margo

(57) ABSTRACT

An electronic system that can automatically set a report rate, which comprises: a first electronic apparatus; a second electronic apparatus; a transmitting interface, wherein the second electronic apparatus transmits data to the first electronic apparatus via the transmitting interface; and a processing unit, for automatically setting a report rate of the second electronic apparatus or the transmitting interface according to a type of a software program that the first electronic apparatus executes.

20 Claims, 9 Drawing Sheets

ELECTRONIC SYSTEM AND NON-TRANSITORY COMPUTER READABLE RECORDING MEDIUM CAN PERFORM REPORT RATE SETTING METHOD

BACKGROUND OF THE INVENTION

1. Field of the Invention

The present invention relates to an electronic system and a computer readable recording media that can perform a report rate setting method, and particularly relates to an electronic system that can automatically perform a report rate setting method and a computer readable recording media that can perform a report rate setting method with an automatic report rate setting mechanism.

2. Description of the Prior Art

In the prior art, if a computer desires to correctly transmit data to and receives data from a peripheral electronic apparatus, the report rate for the peripheral electronic apparatus needs to be set. The report rate indicates the frequency that the peripheral electronic apparatus transmits data. For example, 1000 times/sec or 500 times/sec. The max report rate that can be provided can be determined based on the transmitting ability for the peripheral electronic apparatus or the transmitting ability of the transmitting interface. Not only the max report rate that can be provided but also the sensitivity must be concerned while setting the report rate. Different sensitivities are needed if the computer executes different kinds of soft wares. Higher report rate means the peripheral electronic apparatus has a higher sensitivity, but has larger power consumption. On the contrary, lower report rate means the peripheral electronic apparatus has lower power consumption, but has a lower sensitivity. Therefore a suitable report rate is hard to select. Additionally, a traditional interface is hard for a user to set the report rate.

SUMMARY OF THE INVENTION

Therefore, one objective of the present invention is to provide an electronic system that can automatically perform a report rate setting method and a computer readable recording media that can perform a report rate setting method with an automatic report rate setting mechanism.

Another objective of the present invention is to provide an electronic system that can be manually set a report rate and a computer readable recording media that can perform a report rate setting method with an report rate manually setting mechanism.

One embodiment of the present invention discloses an electronic system that can automatically set a report rate, which comprises: a first electronic apparatus; a second electronic apparatus; a transmitting interface, wherein the second electronic apparatus transmits data to the first electronic apparatus via the transmitting interface; and a processing unit, for automatically setting a report rate of the second electronic apparatus or the transmitting interface according to a type of a software program that the first electronic apparatus executes.

Another embodiment of the present invention discloses an electronic system that can automatically set a report rate, which comprises: a first electronic apparatus; a second electronic apparatus; a transmitting interface, wherein the second electronic apparatus transmits data to the first electronic apparatus via the transmitting interface; and a processing unit, for computing a statistics operation frequency of the second electronic apparatus in a predetermined time period when the first electronic apparatus executes a software program, and sets the report rate of the second electronic apparatus or the transmitting interface according to the statistics operation frequency if the first electronic apparatus executes the software program again.

Still another embodiment of the present invention discloses an electronic system that can automatically set a report rate, which comprises: a first electronic apparatus; a second electronic apparatus; a transmitting interface, wherein the second electronic apparatus transmits data to the first electronic apparatus via the transmitting interface; and a processing unit, for setting a report rate of the second electronic apparatus or the transmitting interface according to a control command of a user.

Different report rate setting methods can be acquired according to above-mentioned embodiments, which can be performed via a computer readable recording media. The steps can be easily obtained based on above-mentioned embodiments, thus are omitted for brevity here.

In view of above-mentioned embodiments, the present invention provides a mechanism for automatically setting the report rate, such that the second electronic apparatus can have an optimized balance for the sensitivity and the power consumption. Additionally, the present invention also provides a mechanism for manually setting the report rate, such that a user can rapidly and conveniently set the report rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
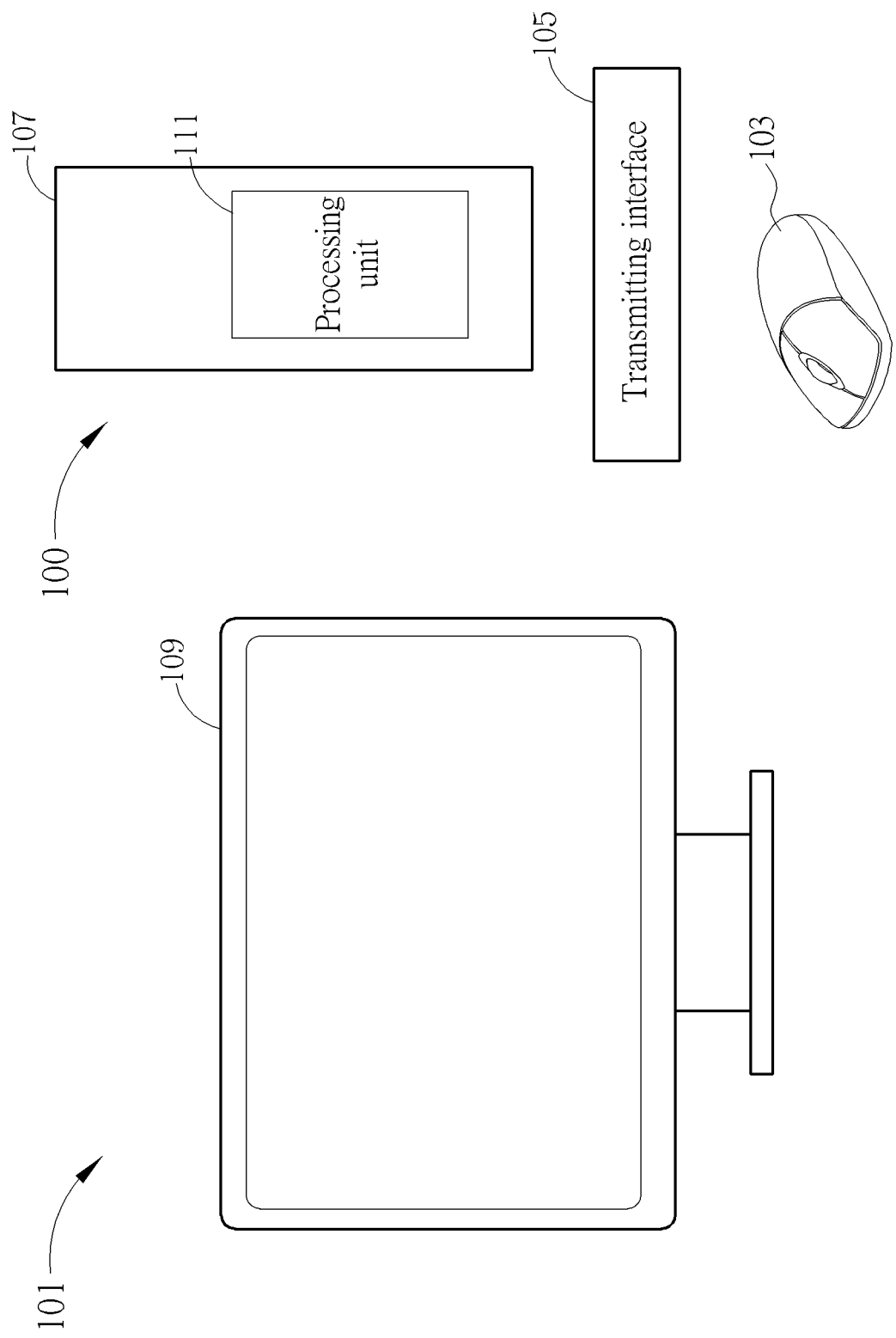
FIG. 1 is a schematic diagram illustrating an electronic system according to an embodiment of the present invention.

FIG. 1 is a schematic diagram illustrating an electronic system 100 according to an embodiment of the present invention. As shown in FIG. 1, the electronic system 100 comprises a first electronic apparatus 101, a second electronic apparatus 103 and a transmitting interface 105 (ex. bluetooth, USB, or other wire/wireless interfaces). The second electronic apparatus 103 transmits data to the first electronic apparatus 101 via the transmitting interface 105. In this embodiment, the first electronic apparatus 101 is a computer, and the second electronic apparatus 103 is an optical mouse. However, it does not mean to limit the scope of the present invention. The first electronic apparatus 101 and the second electronic apparatus 103 can be other electronic apparatuses. As above-mentioned description, the first electronic apparatus 101 is a computer 101 comprising a host 107 and a display 109. The host 107 comprises a processing unit 111 such as the processor. Please note the processing unit 111 can be provided in other locations other than in the host 107. The processing unit 111 automatically sets a report rate of the second electronic apparatus 103 or the transmitting interface 105 according to a type of a software program that the first electronic apparatus 101 executes.

Figure 2:
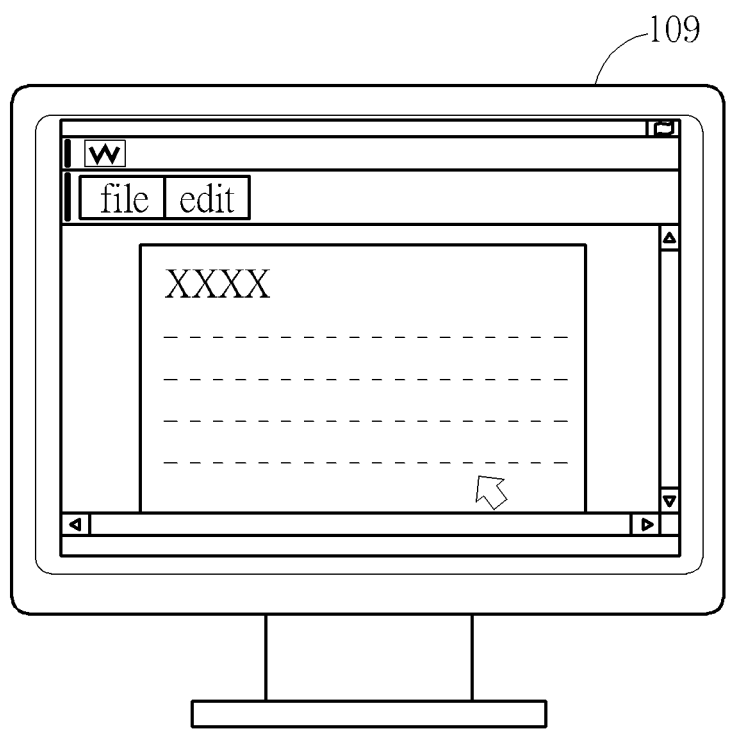
FIG. 2 is a schematic diagram illustrating the situation that an electronic system according to an embodiment executes a document processing software program.
Figure 3:
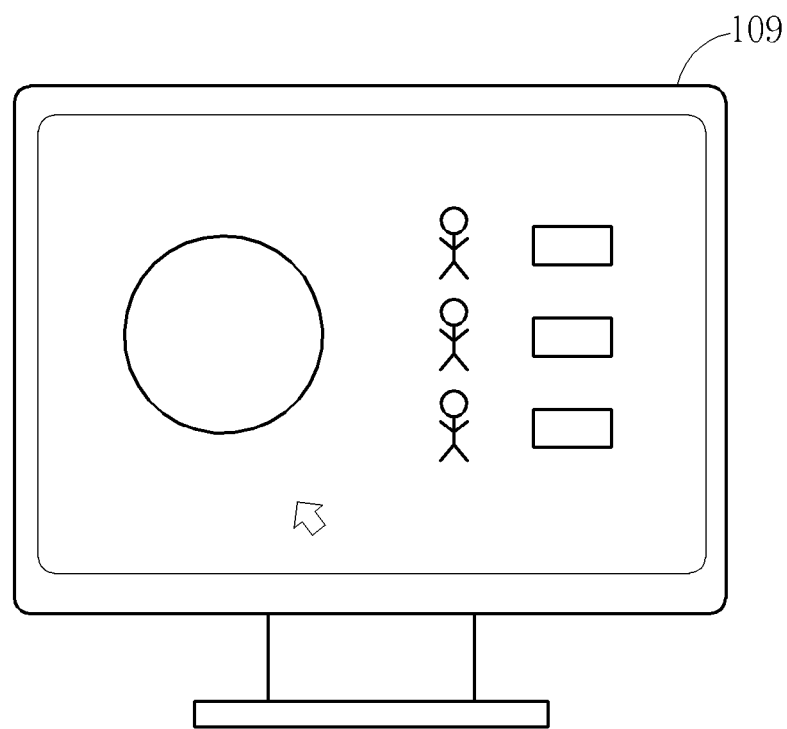
FIG. 3 is a schematic diagram illustrating the situation that an electronic system according to an embodiment executes a game software program.

FIG. 2 is a schematic diagram illustrating the situation that an electronic system 100 according to an embodiment executes a document processing software program. Please only the display 109 in the first electronic apparatus 101 is illustrated in the following embodiments, please also refer to FIG. 1 to understand the concept of the present invention for more clear. If a document processing software program such as word is executed, the processing unit 111 acquires information that the operation frequency for the second electronic apparatus 103 is lower when the document processing software program is executed according to report rate setting information recorded in the host 101, thus automatically sets the report rate of the second electronic apparatus 103 or the transmitting interface 105 to be lower. On the contrary, if a game software program as shown in FIG. 3 is executed, the processing unit 111 acquires information that the operation frequency for the second electronic apparatus 103 is higher when the game software program is executed according to report rate setting information recorded in the host 101, thus automatically sets the report rate of the second electronic apparatus 103 or the transmitting interface 105 to be higher. The above-mentioned report rate setting information can be set by a manufacturer in advance, or set by a user. The report rate setting information acquired by any method should fall in the scope of the present invention.

Please note the scope of the present invention is not limited to the document processing software program or the game software program, thus a mechanism that how the electronic system according to the present invention sets the report rate can be summarized as follows:

the processing unit 111 sets the report rate of the second electronic apparatus 103 or the transmitting interface 105 to a first report rate when the first electronic apparatus 101 executes a first type software program and sets the report rate of the second electronic apparatus 103 or the transmitting interface 105 to a second report rate higher than the first report rate when the first electronic apparatus 101 executes a second type software program, if an operation frequency for the second electronic apparatus 103 when the first electronic apparatus 101 executes the first type software program is lower than an operation frequency for the second electronic apparatus 103 when the first electronic apparatus 101 executes the second type software program.

The report rate setting information can be set by the manufacturer or the user, as above-mentioned. Furthermore, the processing unit 111 computes a statistics operation frequency of the second electronic apparatus 103 in a predetermined time period when the first electronic apparatus 101 executes a software program, and sets the report rate of the second electronic apparatus 103 or the transmitting interface 105 according to the statistics operation frequency if the first electronic apparatus 101 executes the software program again. The statistics operation frequency means a statistic value indicating how often the operations provided by the software program are executed. Take FIG. 4 for example, if the report rate setting information does not comprise the information which report rate should be set to the second electronic apparatus 103 or the transmitting interface 105 when the first electronic apparatus 101 executes a media displaying software program, the processing unit 111 will compute a statistics operation frequency of the second electronic apparatus 103 in a predetermined time period when the first electronic apparatus 101 executes the media displaying software program. In the next time, if the first electronic apparatus 101 executes the media displaying software program again, the report rate for the second electronic apparatus 103 or the transmitting interface 105 is set according to the statistics operation frequency. Please note the above-mentioned report rate setting mechanism is not limited to be utilized to set report rates according to different types of software programs, but also can be utilized to set report rates according to the same types but different software programs. For example, one game software program may need fast and frequent movement for the second electronic apparatus 103, but another one does not. In such case, the operation frequencies for the second electronic apparatus 103 can be respectively computed for these two game software programs and the report rate of the second electronic apparatus 103 can be set accordingly.

Figure 5:
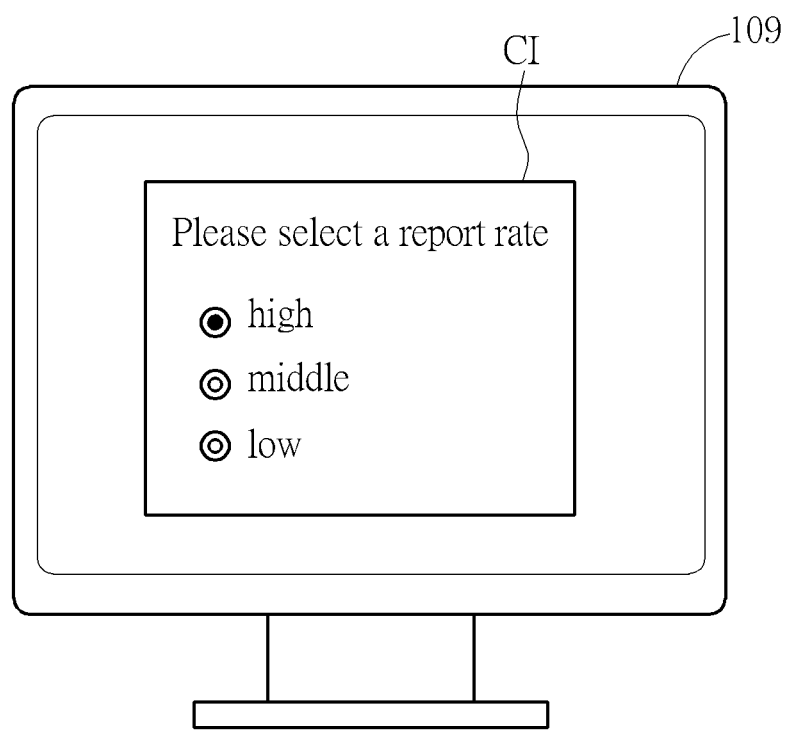
FIG. 5 and FIG. 6 are schematic diagrams illustrating how to manually set the report rate.
Figure 6:
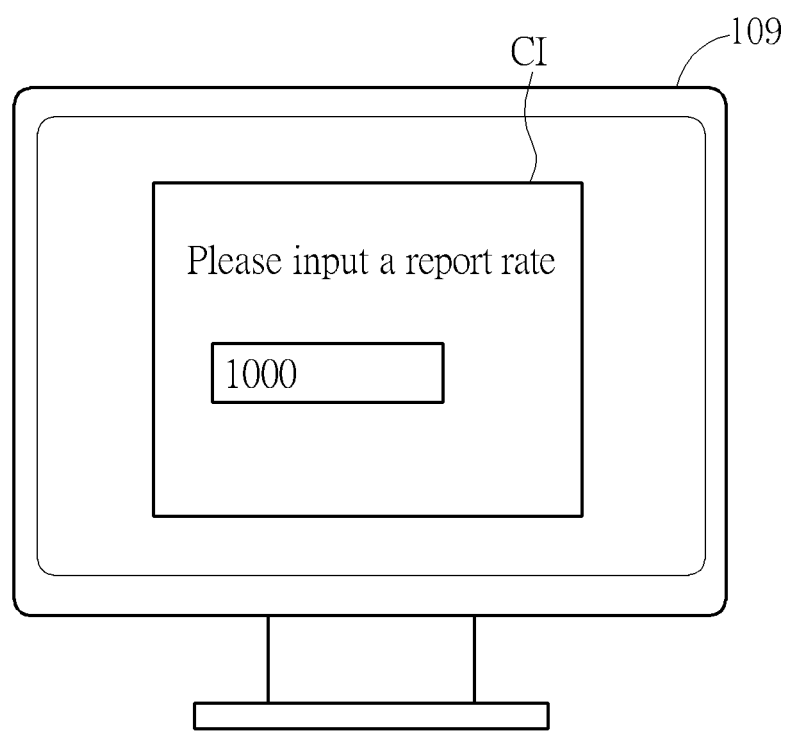

Besides above-mentioned automatic set mechanism, the present invention further provides a mechanism for manually setting the report rate. As shown in FIG. 5 and FIG. 6, the user can send a control command to the processing unit 111 in FIG. 1 via a control interface CI. The report rate is set according to the control command if the processing unit 111 in FIG. 1 receives the control command. The control interface CI can be utilized to set the report rate to a level (ex. high, medium, low) such as FIG. 5, or utilized to set the report rate directly to a value such as FIG. 6. Please note the mechanism for manually setting the report rate provided by the present invention is not limited to the embodiments shown in FIG. 5 and FIG. 6, the control interface CI can be interfaces for other types. The control interface CI can be activated by many mechanisms. For example, a switch can be provided on the second electronic apparatus 103 to activate the control interface CI, or it can be activated via clicking a symbol on the display 109.

The electronic system 100 according to the present invention 100 can further comprise a switch mechanism to determine how to set the report rate. For example, a hardware can be provided on the host 107 to determine which one of the following modes is performed: an automatic report rate setting, setting the report rate to a fixed value, manually setting the report rate. Alternatively, an interface can be shown on the display 109 such that the user select the mode via the interface. Such variations should fall in the scope of the present invention.

Figure 7:
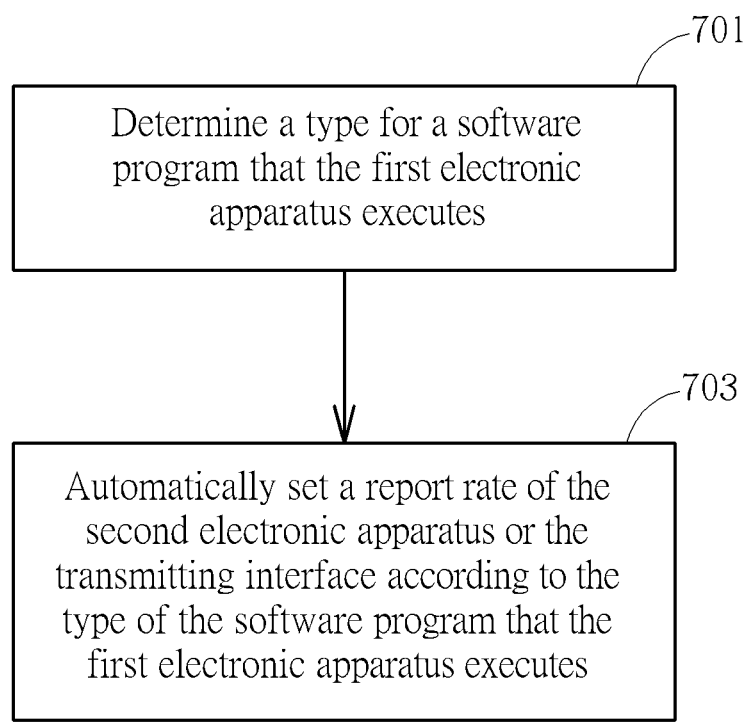
FIG. 7 to FIG. 9 are flow charts illustrating report rate setting methods according to embodiments of the present invention.
Figure 8:
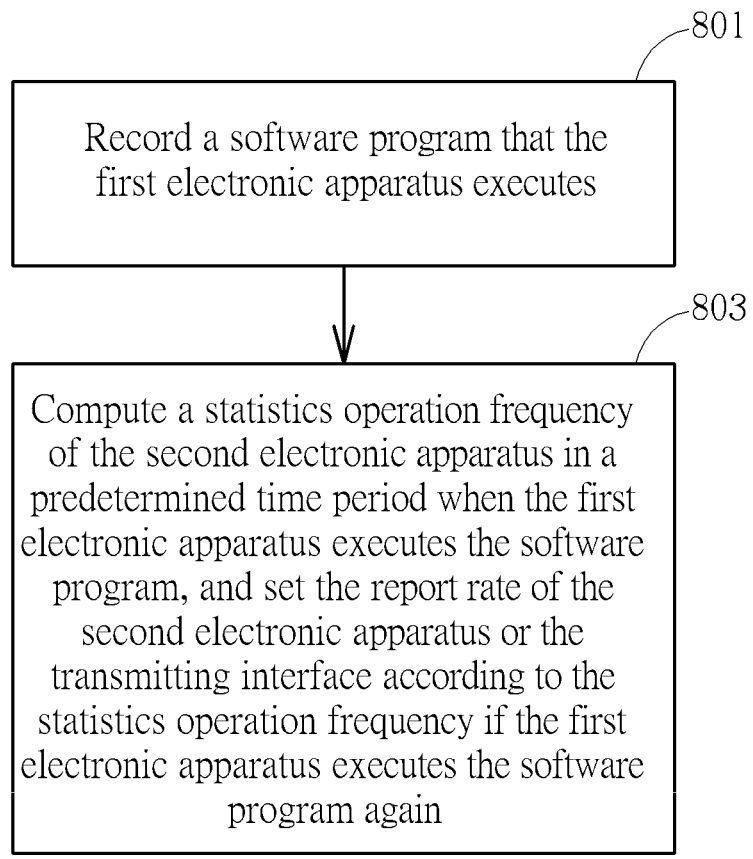
Figure 9:
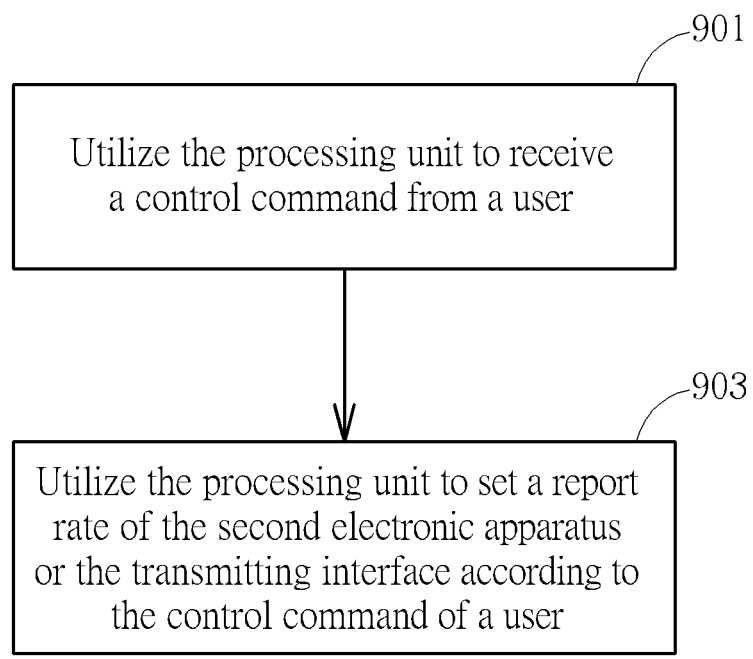

In view of above-mentioned embodiments, report rate setting methods shown in FIG. 7-FIG. 9 can be acquired. The report rate setting methods can be executed via a computer readable recording media having at least one program code recorded thereon. The report rate setting methods can be performed when the programs are executed.

The report rate setting method in FIG. 7 corresponds to the embodiments shown in FIG. 2 and FIG. 3, which comprise the following steps:

Step 701

Determine a type for a software program that the first electronic apparatus 101 executes.

Step 703

Automatically set a report rate of the second electronic apparatus 103 or the transmitting interface 105 according to the type of the software program that the first electronic apparatus 101 executes.

Figure 4:
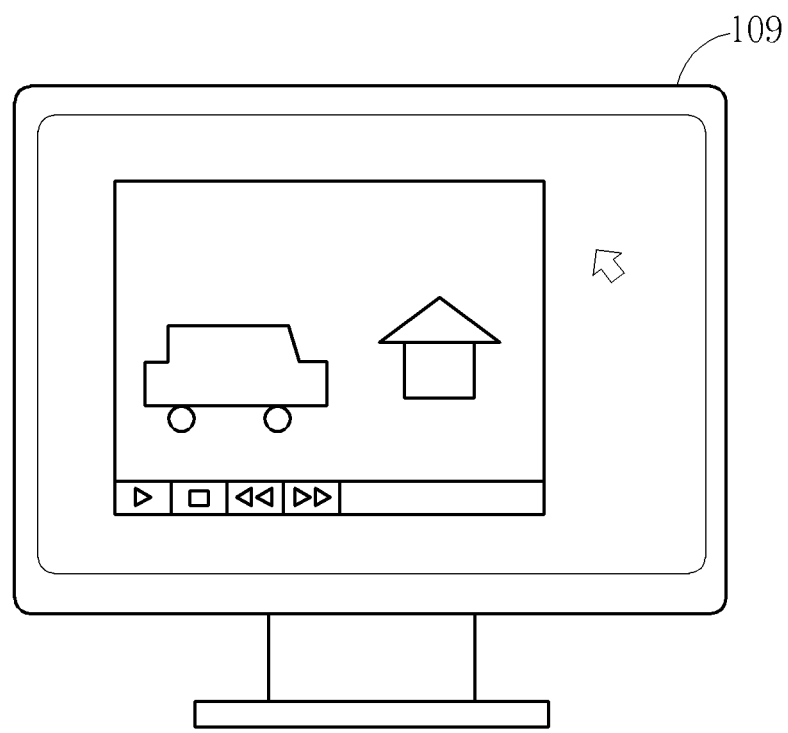
FIG. 4 is a schematic diagram illustrating the situation that an electronic system according to an embodiment executes a media displaying software program.

The report rate setting method in FIG. 8 corresponds to the embodiment shown in FIG. 4, which comprise the following steps:

Step 801

Record a software program that the first electronic apparatus 101 executes.

Step 803

Compute a statistics operation frequency of the second electronic apparatus 103 in a predetermined time period when the first electronic apparatus 101 executes the software program, and set the report rate of the second electronic apparatus 103 or the transmitting interface 105 according to the statistics operation frequency if the first electronic apparatus 101 executes the software program again.

The report rate setting method in FIG. 9 corresponds to the embodiments shown in FIG. 5 and FIG. 6, which comprise the following steps:

Step 901

Utilize the processing unit 111 to receive a control command from a user.

Step 903

Utilize the processing unit 111 to set a report rate of the second electronic apparatus 103 or the transmitting interface 105 according to the control command of a user.

In view of above-mentioned embodiments, the present invention provides a mechanism for automatically setting the report rate, such that the second electronic apparatus can have an optimized balance for the sensitivity and the power consumption. Additionally, the present invention also provides a mechanism for manually setting the report rate, such that a user can rapidly and conveniently set the report rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system that can automatically set a report rate, comprising:
    a first electronic apparatus;
    a second electronic apparatus;
    a transmitting interface, wherein the second electronic apparatus transmits data to the first electronic apparatus via the transmitting interface; and
    a processing unit, arranged to:
    determine a type of a software program that the first electronic apparatus executes; and
    automatically set a report rate of the second electronic apparatus or the transmitting interface according to the type of the software program, wherein the report rate indicates a frequency at which the second electronic apparatus transmits data to the first electronic apparatus, and the report rate indicates a time gap between successive transmissions of data from the second electronic apparatus to the first electronic apparatus.

2. The electronic system of claim 1, wherein the processing unit sets the report rate of the second electronic apparatus or the transmitting interface to a first report rate when the first electronic apparatus executes a first type software program and sets the report rate of the second electronic apparatus or the transmitting interface to a second report rate higher than the first report rate when the first electronic apparatus executes a second type software program, if an operation frequency for the second electronic apparatus when the first electronic apparatus executes the first type software program is lower than an operation frequency for the second electronic apparatus when the first electronic apparatus executes the second type software program.

3. The electronic system of claim 1, wherein the processing unit sets the report rate of the second electronic apparatus or the transmitting interface to a first report rate when the first electronic apparatus executes a document processing software program and sets the report rate of the second electronic apparatus or the transmitting interface to a second report rate higher than the first report rate when the first electronic apparatus executes a game software program.

4. The electronic system of claim 1, wherein the processing unit computes a statistics operation frequency of the second electronic apparatus in a predetermined time period when the first electronic apparatus executes a software program, and sets the report rate of the second electronic apparatus or the transmitting interface according to the statistics operation frequency if the first electronic apparatus executes the software program again.

5. The electronic system of claim 1, wherein the first electronic apparatus is a computer, and the second electronic apparatus is a peripheral electronic apparatus.

6. The electronic system of claim 1, wherein the processing unit sets the report rate of the second electronic apparatus or the transmitting interface to a fixed value via a selecting mechanism, or sets the report rate of the second electronic apparatus or the transmitting interface according to the type of the software program that the first electronic apparatus executes.

7. An electronic system that can automatically set a report rate, comprising:
    a first electronic apparatus;
    a second electronic apparatus;
    a transmitting interface, wherein the second electronic apparatus transmits data to the first electronic apparatus via the transmitting interface; and
    a processing unit, arranged to:
    compute a statistics operation frequency of the second electronic apparatus in a predetermined time period when the first electronic apparatus executes a software program; and
    set the report rate of the second electronic apparatus or the transmitting interface according to the statistics operation frequency if the first electronic apparatus executes the software program again, wherein the report rate indicates a frequency at which the second electronic apparatus transmits data to the first electronic apparatus, and the report rate indicates a time gap between successive transmissions of data from the second electronic apparatus to the first electronic apparatus.

8. A non-transitory computer readable recording medium storing at least one program, a report rate setting method applied to an electronic system comprising a first electronic apparatus, a second electronic apparatus and a transmitting interface can be performed if the program is executed, wherein the second electronic apparatus transmits data to the first electronic apparatus via the transmitting interface, where the report rate setting method comprises:
    (a) determining a type for a software program that the first electronic apparatus executes; and
    (b) automatically setting a report rate of the second electronic apparatus or the transmitting interface according to the type of the software program, wherein the report rate indicates a frequency at which the second electronic apparatus transmits data to the first electronic apparatus, and the report rate indicates a time gap between successive transmissions of data from the second electronic apparatus to the first electronic apparatus.

9. The non-transitory computer readable recording medium of claim 8, wherein the step (b) comprises:
setting the report rate of the second electronic apparatus or the transmitting interface to a first report rate when the first electronic apparatus executes a first type software program and setting the report rate of the second electronic apparatus or the transmitting interface to a second report rate higher than the first report rate when the first electronic apparatus executes a second type software program, if an operation frequency for the second electronic apparatus when the first electronic apparatus executes the first type software program is lower than an operation frequency for the second electronic apparatus when the first electronic apparatus executes the second type software program.

10. The non-transitory computer readable recording medium of claim 8, wherein the step (b) comprises:
setting the report rate of the second electronic apparatus or the transmitting interface to a first report rate when the first electronic apparatus executes a document processing software program and setting the report rate of the second electronic apparatus or the transmitting interface to a second report rate higher than the first report rate when the first electronic apparatus executes a game software program.

11. The non-transitory computer readable recording medium of claim 8, further comprising:
computing a statistics operation frequency of the second electronic apparatus in a predetermined time period when the first electronic apparatus executes a software program, and setting the report rate of the second electronic apparatus or the transmitting interface according to the statistics operation frequency if the first electronic apparatus executes the software program again.

12. The non-transitory computer readable recording medium of claim 8, wherein the first electronic apparatus is a computer, and the second electronic apparatus is a peripheral electronic apparatus.

13. The non-transitory computer readable recording medium of claim 8, further comprising:
setting the report rate of the second electronic apparatus or the transmitting interface to a fixed value via a selecting mechanism, or setting the report rate of the second electronic apparatus or the transmitting interface according to the type of the software program that the first electronic apparatus executes.

14. A non-transitory computer readable recording medium storing at least one program, a report rate setting method applied to an electronic system comprising a first electronic apparatus, a second electronic apparatus and a transmitting interface can be performed if the program is executed, wherein the second electronic apparatus transmits data to the first electronic apparatus via the transmitting interface, where the report rate setting method comprises:
(a) recording a software program that the first electronic apparatus executes;
(b) computing a statistics operation frequency of the second electronic apparatus in a predetermined time period when the first electronic apparatus executes the software program; and
(c) setting the report rate of the second electronic apparatus or the transmitting interface according to the statistics operation frequency if the first electronic apparatus executes the software program again, wherein the report rate indicates a frequency at which the second electronic apparatus transmits data to the first electronic apparatus, and the report rate indicates a time gap between successive transmissions of data from the second electronic apparatus to the first electronic apparatus.

15. The electronic system of claim 1, further comprising a host;
wherein the electronic system further comprises hardware configured to determine which one of following modes is performed: an automatic report rate setting, setting the report rate to a fixed value, manually setting the report rate.

16. The electronic system of claim 7, further comprising a host;
wherein the electronic system further comprises hardware configured to determine which one of following modes is performed: an automatic report rate setting, setting the report rate to a fixed value, manually setting the report rate.

17. The electronic system of claim 1, wherein the second electronic apparatus does not receive any video stream.

18. The electronic system of claim 7, wherein the second electronic apparatus does not receive any video stream.

19. The non-transitory computer readable recording medium of claim 8, wherein the second electronic apparatus does not receive any video stream.

20. The non-transitory computer readable recording medium of claim 14, wherein the second electronic apparatus does not receive any video stream.

* * * * *